(12) United States Patent
Lu

(10) Patent No.: US 8,959,335 B2
(45) Date of Patent: Feb. 17, 2015

(54) SECURE PASSWORD-BASED AUTHENTICATION FOR CLOUD COMPUTING SERVICES

(75) Inventor: HongQian Karen Lu, Austin, TX (US)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 13/448,928

(22) Filed: Apr. 17, 2012

(65) Prior Publication Data
US 2013/0275748 A1 Oct. 17, 2013

(51) Int. Cl.
H04L 29/06 (2006.01)

(52) U.S. Cl.
USPC .......................................................... 713/155

(58) Field of Classification Search
CPC ............................ H04L 63/0853; H04L 67/14
USPC .......................................................... 713/155
See application file for complete search history.

(56) References Cited

U.S. PATENT DOCUMENTS

| | | | | |
|---|---|---|---|---|
| 6,099,408 A * | 8/2000 | Schneier et al. | ................ | 463/29 |
| 6,886,102 B1 * | 4/2005 | Lyle | ................ | 726/23 |
| 2003/0012382 A1 * | 1/2003 | Ferchichi et al. | ............. | 380/270 |
| 2003/0163737 A1 | 8/2003 | Roskind | | |
| 2007/0118758 A1 * | 5/2007 | Takahashi et al. | ............ | 713/186 |
| 2008/0235772 A1 | 9/2008 | Janzen | | |
| 2011/0099616 A1 * | 4/2011 | Mazur et al. | ....................... | 726/7 |
| 2012/0030475 A1 * | 2/2012 | Ma et al. | ........................ | 713/186 |
| 2012/0042216 A1 * | 2/2012 | Blubaugh | ........................ | 714/48 |
| 2012/0054845 A1 * | 3/2012 | Rodriguez et al. | ................ | 726/7 |
| 2013/0007845 A1 * | 1/2013 | Chang et al. | ...................... | 726/4 |
| 2013/0024919 A1 * | 1/2013 | Wetter et al. | ...................... | 726/6 |
| 2013/0067582 A1 * | 3/2013 | Donovan et al. | ................ | 726/25 |
| 2013/0219476 A1 * | 8/2013 | Lin et al. | .......................... | 726/4 |

FOREIGN PATENT DOCUMENTS

EP 1528451 A1 5/2005

OTHER PUBLICATIONS

Schneier, Applied Crytpography, 1996, Second Edition, 31-32, 75-76, and 357-358.*
PCT/EP2013/058018 International Search Report, Jun. 7, 2013, European Patent Office, P.B. 5818 Patentlaan 2 NL-2280 HV Rijswijk.

* cited by examiner

Primary Examiner — Bradley Holder
(74) Attorney, Agent, or Firm — The Jansson Firm; Pehr B. Jansson

(57) ABSTRACT

Secure password-based authentication for cloud service computing. A request for cloud computing resource access includes a derivative password that contains a parameter that the recipient may extract in order to independently calculate the derivative password based on the parameter and a stored password which may then be verified against a known-to-be-correct password. Other systems and methods are disclosed.

27 Claims, 5 Drawing Sheets

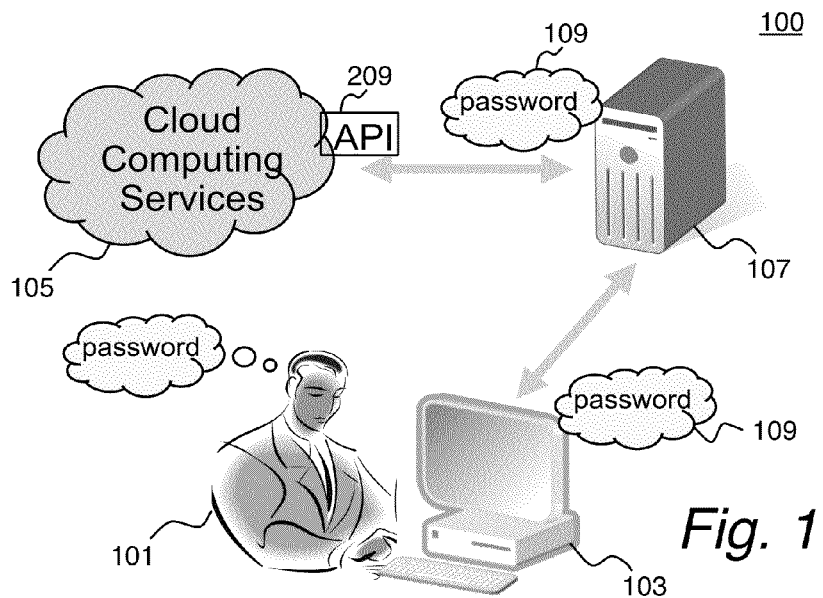
Fig. 1
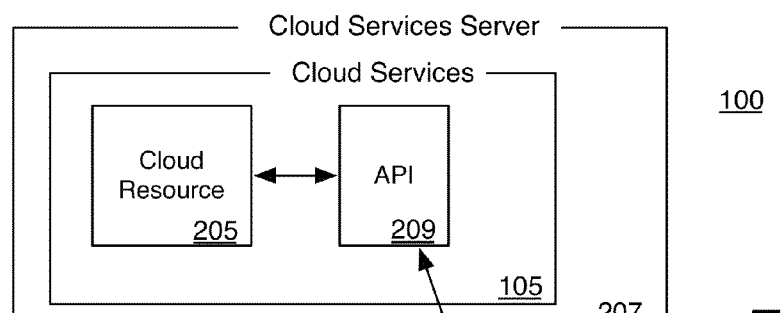
Fig. 2
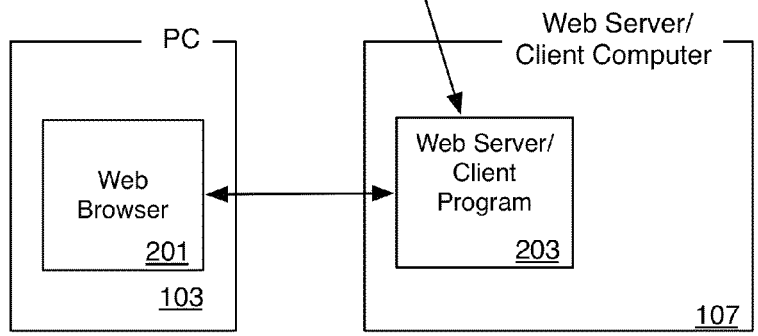

SECURE PASSWORD-BASED AUTHENTICATION FOR CLOUD COMPUTING SERVICES

BACKGROUND OF THE INVENTION

The present invention relates generally to cloud computing, and more particularly, to secure password-based authentication for cloud computing resource access.

Cloud computing is becoming an increasingly popular mode for computerized access to both data and application programs. By using cloud computing, users may provide a centralized depository for shared data, a secure backup and file storage, use of applications programs that can run on relatively higher-speed cloud servers, etc. By using cloud computing services, users may increase the level of integrity of their data in that a third party with a dedicated focus on data processing is in charge of maintaining the security and integrity of data. Cloud computing users may feel relatively certain that their data is backed up and their security maintained by the cloud service provider (CSP).

Another advantage for users of cloud-computing services is the access to powerful application programs that may be prohibitively or unnecessarily expensive for a user to acquire and maintain. A cloud-service provider may provide access to certain application programs either for a small fee or on some other revenue model that is advantageous to their users as compared to the users having the same or equivalent programs running locally on user machines.

One crucial aspect for the cloud computing model to work is that the data managed by the CSPs on behalf of their users must be secure and that only authorized individuals and entities may access application programs hosted in the cloud. Traditionally such user validation is performed using the username-password model. The username-passwords are transmitted to the API of the CSP by a client program executing on a client computer. Often the username-passwords are embedded in requests made to the CSP by the client program.

The aforementioned authentication mechanism is prone to attack. Because client computers and client programs are used to formulate requests, the client program is aware of the password and thus cannot be completely trusted. Furthermore, the password is vulnerable to phishing attacks, to snooping, to poor user practices such as leaving passwords on notes, to keystroke loggers, etc.

However, even with such vulnerabilities, cloud service providers are reluctant to adopt more secure authentication methods—such as digital signatures, TLS mutual authentication, or cryptographic hash—that do not reveal passwords to the client programs because doing so would require expensive and cumbersome modifications to the cloud service infrastructure.

From the foregoing it will be apparent that there is still a need for an improved mechanism for secure password-based cloud computing application programming interfaces without burdening cloud computing service providers with extensive modifications to cloud computing infrastructure.

BRIEF DESCRIPTION OF THE DRAWINGS

FIG. 1 is a schematic illustration of a networked computing operating environment 100 for providing cloud computing services.

FIG. 2 is a block diagram illustrating one example of software programs interacting over the networked environment of FIG. 1.

DETAILED DESCRIPTION OF THE INVENTION

Figure 3:
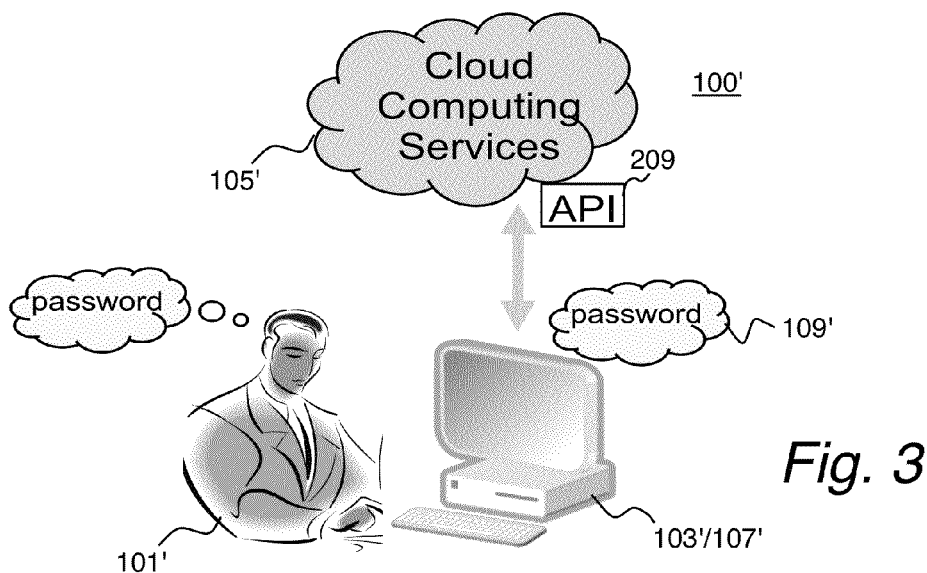
FIG. 3 illustrates an alternative cloud computing operating environment.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

A technology is presented herein in which a mechanism is provided that enhances password-security in cloud application interfaces without burdening cloud-computing service providers with a requirement for extensive security modifications to cloud-computing infrastructure.

FIG. 1 is a schematic illustration of a networked computing operating environment 100 for providing cloud computing services. A user 101 using a personal computer 103 accesses cloud computing services 105 via a web server computer 107 that acts as a client with respect to the cloud computing services 105. The user 101 accesses the cloud-computing services 105 via a network application program executing on the personal computer 103. The network application program, for example, a web browser 201 as illustrated in FIG. 2, interacts with a web server program 203 executing on the web server/client computer 107.[1]

[1] Herein—for the sake of a lucid narrative—we formulate the discussion of the actions taken by various hardware components when they execute computer programs as if it were the programs that carried out the actions. For example, we may say "The client program 203 determines the need for access to a cloud resource 205." That should be taken as shorthand to mean that the computer executing the client program performs actions that result in a determination of some logical value, that value representing the need for the computer to access a cloud resource.

FIG. 2 is a block diagram illustrating one example of the software programs interacting over the networked environment 100 of FIG. 1. As discussed above, the web browser 201 interacts with the web server program 203 to obtain access to cloud resources 205. The web server program 203 accesses cloud resources 205 managed by the Cloud Services 105 and residing on the cloud computing services server 207 and is, therefore, a client with respect to the cloud service 105. Hereinafter, this program, which acts as a server with respect to the user's PC and as a client with respect to the cloud service 105, is referred to as the client program 203. The cloud service 105 publishes an application program interface (API) 209 by which client programs, such as the web server/client program 203, may access cloud resources 205. An example of a common cloud services API is the RESTful API which is a simple web service implemented using HTTP.

FIG. 3 illustrates an alternative cloud computing operating environment 100'[2]. In this alternative, the functions of the webserver 107 and web server program 203 are handled by the user's personal computer 103 and web browser 201. Thus, the user 101' interacts directly with the cloud computing services 105' via a client program 203' (not shown in FIG. 3) executing on the user's personal computer 103'.

[2] Herein we use the convention that a prime (') or double-prime (") is used to signify elements that are essentially the same but which may be different instances of the same class of elements. For example, user 101 and user 101' are both users of cloud computing services. However, they use slightly different environments to access the cloud services. Generally, statements pertinent to the unprimed element apply to the primed counterpart unless specifically stated or if, from context, it may be inferred otherwise.

Figure 4:
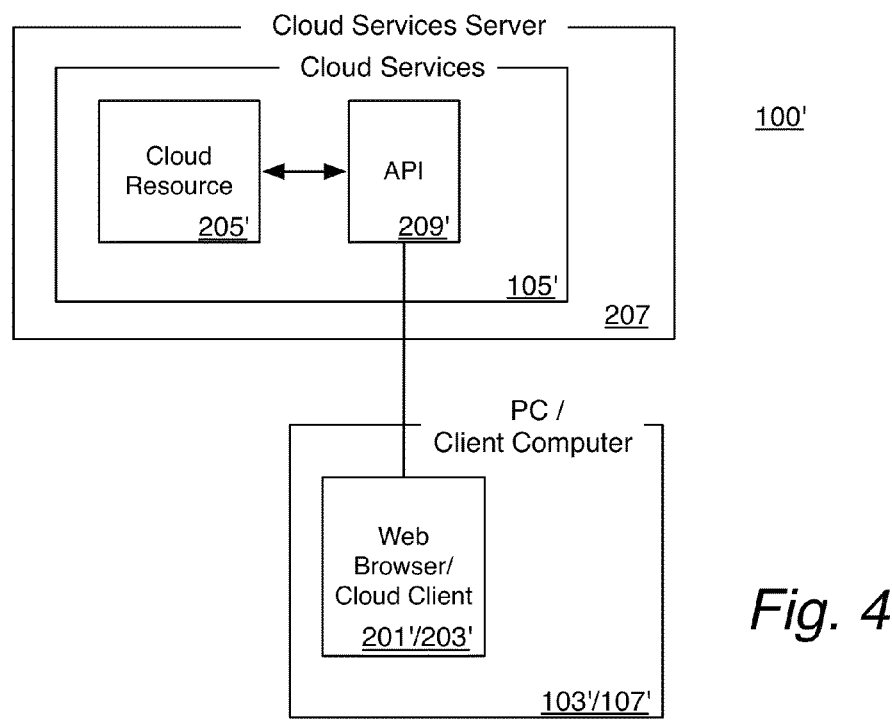
FIG. 4 is a block diagram illustrating the software programs residing on the computers of FIG. 3.

FIG. 4 is a block diagram illustrating the software programs residing on the computers of FIG. 3 and interacting with one another to provide the user 101' access to cloud services 105' in the network operating environment 100' of FIG. 3. In the example of FIG. 4, the web browser 201' acts as client 203' to the cloud service provider API 209'. Hereinafter, the term client program 203 refers to the combined web application/cloud client executing on the user's PC 103 as well as to the web server/client program 203 of the embodiment illustrated in FIGS. 1 and 2.

While both the examples above and the discussion which follows discuss the presented technology in the context of personal computers, e.g., the personal computer 103 illustrated in FIG. 1, the technology is equally applicable to other computing platforms such as, but not limited to, smart telephones and tablet computers.

Typically a web API, such as API 209, is defined in terms of request messages and associated response structures. Such requests must be authenticated. Therefore, each API request includes a client authentication that proves to the cloud service provider that the client has been authorized to access the requested cloud resource 205.

In the scenarios of FIGS. 1 and 3, the user 101 knows and enters the password on the personal computer 103, for example, in the client program 203 or in a web browser 201 that is interacting with the client program 203. The password is then transmitted to the cloud services 105 with each API request, for example in an HTTP request header, and the cloud services 105 verify the correctness of the password against a password database.

Because the client application 203 forms and sends the request, the client application 203 has direct access to the password 109. Password-based authentication is very weak and vulnerable to many forms of attack including phishing, snooping, user error such as leaving notes with passwords where visible, keystroke logging, etc.

Figure 5:
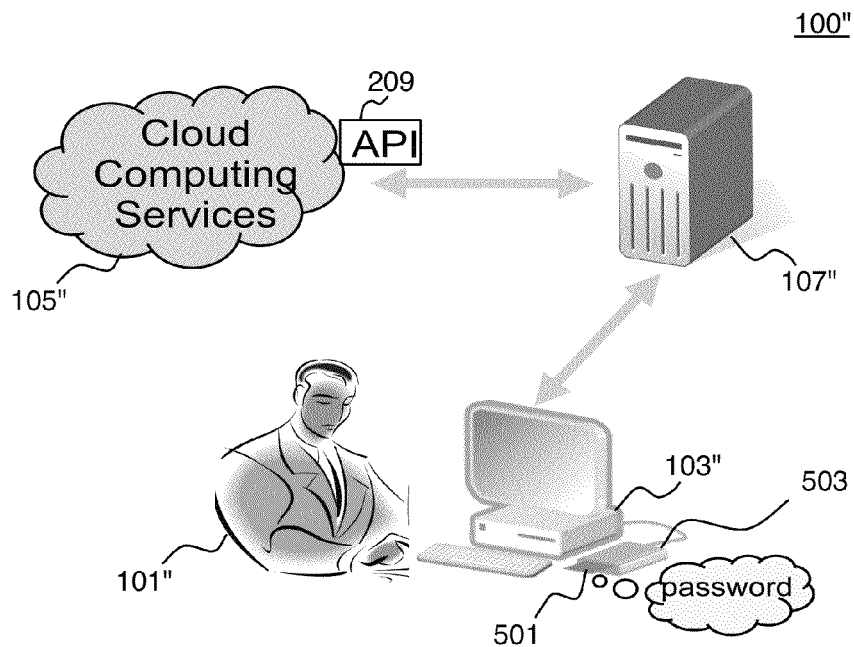
FIGS. 5 and 6, counterparts to FIGS. 1 and 3, respectively, are high-level diagrams illustrating alternative embodiments in which the password used for cloud computing services authentication is stored and managed by a security device.
Figure 6:
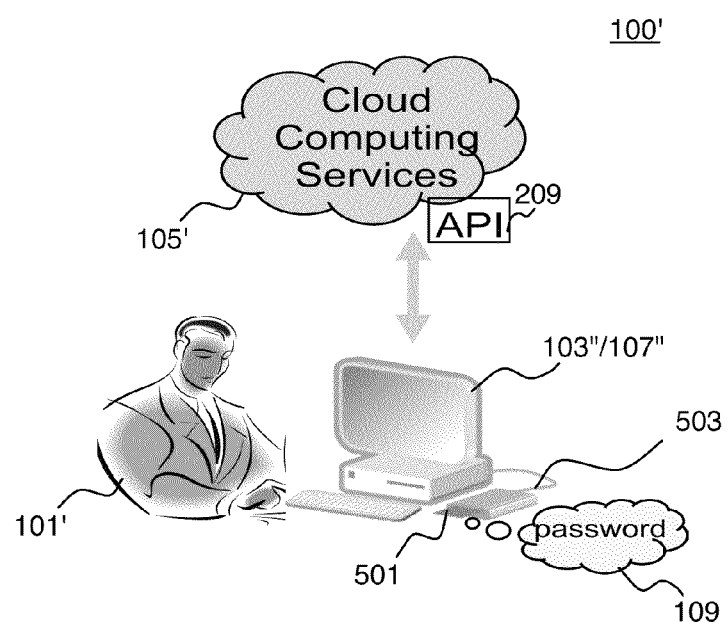

FIGS. 5 and 6, counterparts to FIGS. 1 and 3, respectively, are high-level diagrams illustrating alternative embodiments in which the password used for cloud-computing-services authentication is stored and managed by a security device 501, such as a smart card or SD (Secure Digital) card, hereinafter collectively referred to as "security device." The security device 501 may be connected to the personal computer 103 via a card reader 503 or inserted into a communications port of the personal computer 103 (e.g., a Universal Serial Bus (USB)). In alternative embodiments, the personal computer 103 is a mobile communications device, e.g., a mobile telephone. In such embodiments, the security device 501 may be a UICC (Universal Integrated Circuit Card) or Subscriber Identity Module (SIM) card.

Figure 7:
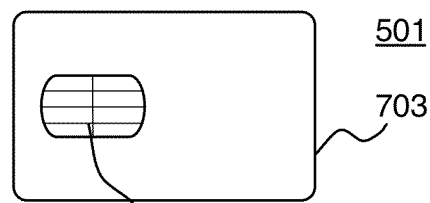
FIG. 7 illustrates one form factor for the security device.

FIG. 7 illustrates one form factor for the security device 501 in which contacts 701 are affixed to a plastic—e.g., polyvinyl chloride—substrate 703. Not visible is a smart card module 801 (illustrated in FIG. 8) connected to the contacts 701. The contacts 701 provide a communications path between the smart card module 801 and the card reader 503 or communications port. In an alternative embodiment, the smart card module communicates wirelessly to a terminal or host computer.

Figure 8:
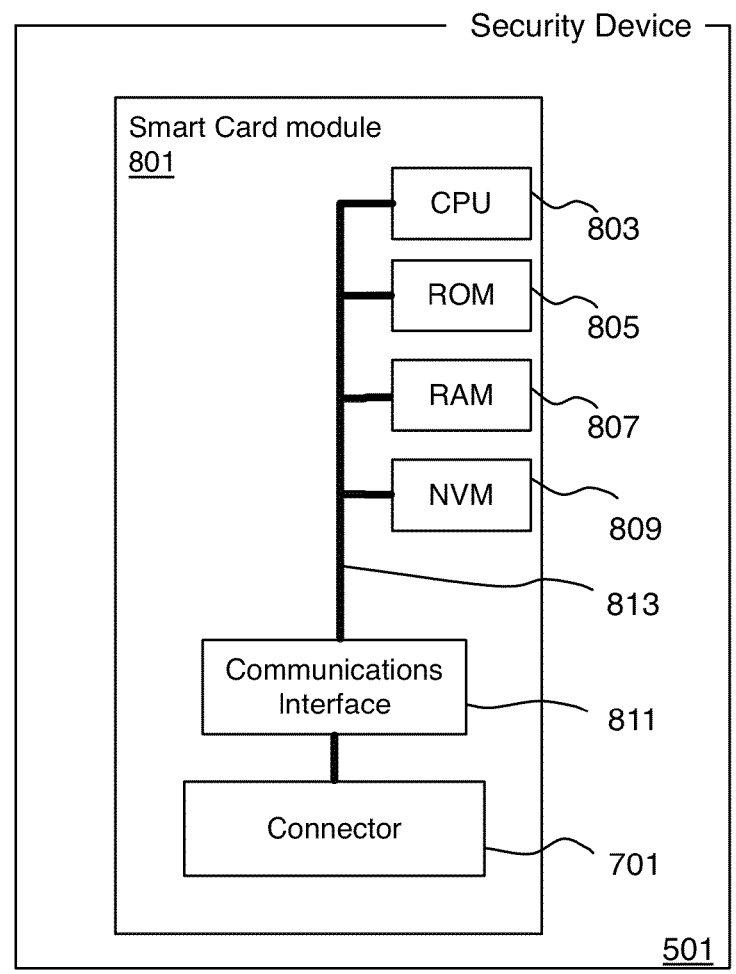
FIG. 8 is a schematic illustration of an exemplary architecture of a smart card module.

FIG. 8 is a schematic illustration of an exemplary architecture of a smart card module 801 included in a security device 501. The smart card module 801 has a central processing unit 803, a read-only memory (ROM) 805, a random access memory (RAM) 807, a non-volatile memory (NVM) 809, and a communications interface 811 for receiving input and sending output to a device, such as the smart card reader 503 and the host computer 103 to which the smart card module 801 is connected, via the connector 701. These various components are connected to one another, for example, by bus 813. In one embodiment of the invention, the on-card software used to implement the methods described herein may be stored on the smart card module 801 in the ROM 805 or the NVM 809. During operation, the CPU 203 operates according to instructions in the various software modules stored in the ROM 805 or NVM 809.

Figure 9:
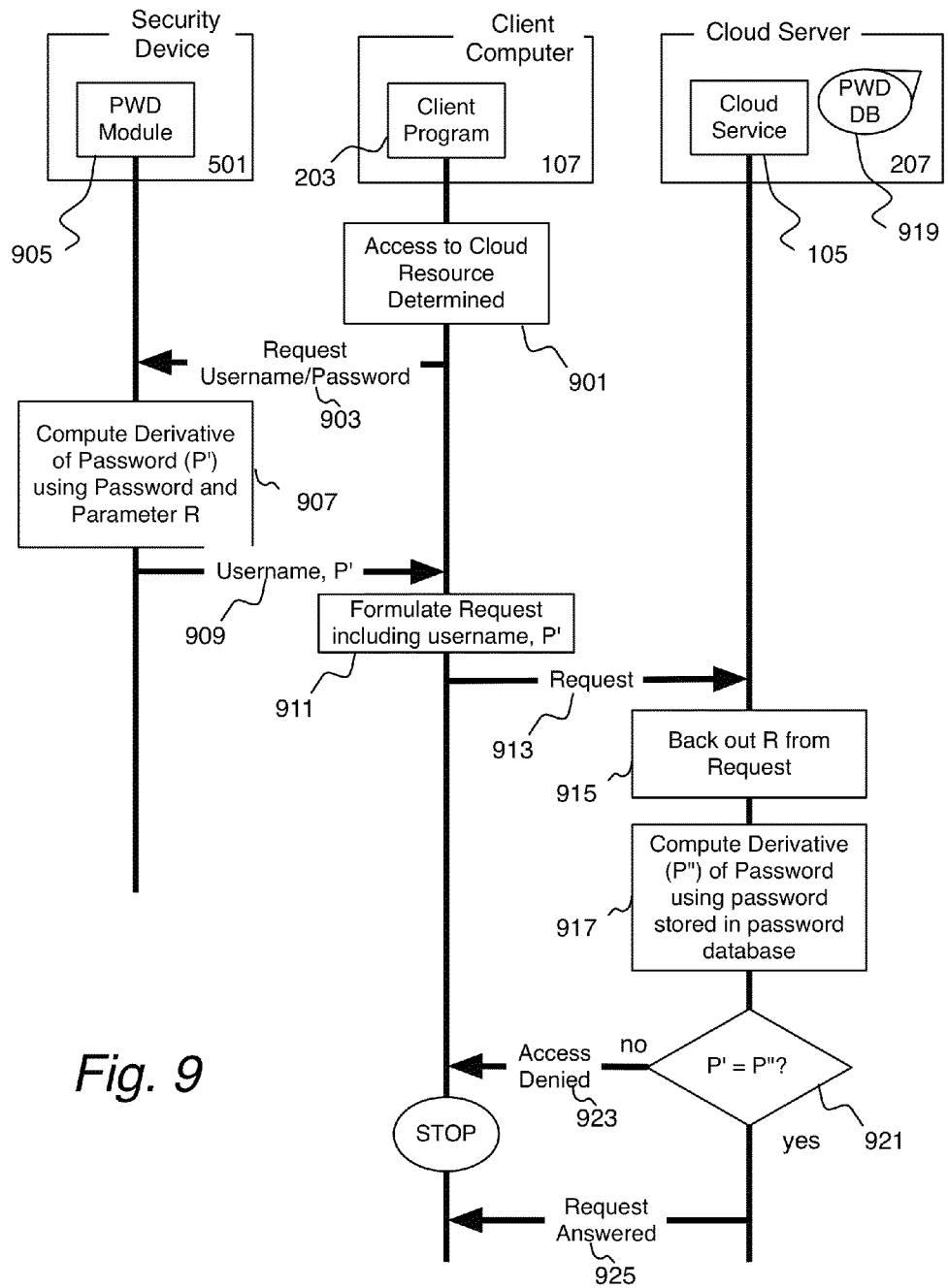
FIG. 9 is a timing sequence diagram illustrating a mechanism by which a password stored on the security device is used to authenticate a client to a cloud service.

FIG. 9 is a timing sequence diagram illustrating a mechanism by which a password stored on the security device 501 is used to authenticate a client 203 to a cloud service 105 without requiring substantial modifications to the security and authentication methods of the cloud service 105. The general principle of this method includes the following concepts:

The cloud service 105 uses password-based authentication methodology, albeit, modified as described below.

The user stores a password or password equivalent on the security device 501. The techniques described herein are primarily described as password-based. However, in many cases password-equivalent information may be used in lieu of an actual password memorized by a user. Such password-equivalents may be obtained using one-way hash or encryption techniques. The same password or password-equivalent is stored by the cloud service 105 in a password database.

The client application 203 executing on the client computer 107 requests the security device 501 to provide the username-password when client application 203 sends requests to the server to access cloud resources 205.

The security device 501 presents a derivative of the password. The derivative is unique for each use, i.e., for each request, and contains some information by which the cloud service 105 may verify the derivative of the password. The cloud service 105 verifies the derivative of the password against its existing database of passwords/password-equivalents.

The following steps are predicated on successful authentication of the user to the security device 501. This authentication is not shown in FIG. 9.

The client program 203 determines the need for access to a cloud resource 205, step 901. This may occur when a user makes a request to, for example, execute a software program residing in the cloud, retrieve a computer file stored as a cloud resource, or perform any certain task using the client program 203 which needs to access a cloud resource 205.

The client program 203 requests the security device 501 to return the username and password of the user, step 903. The request may be directed to a password applet 905 of the security device 501.

The security device 501, for example, directed by instructions from the password applet 905, computes a derivative password (P') derived from the user's password, step 907. The user's password may be stored in NVM 809 of the security device 501.

To compute the derivative password the password module 905 uses a function F which takes the password and a parameter R as input:

$$F(R, \text{Password})$$

Function F may be a pre-specified one-way cryptography function. R should change on each computation of the derived password. R could be a pseudo-random number, a time based number, or any other number that is near-guaranteed to not repeat. For example, the derived password is a one-way cryptographic hashing of R using the password as the key.

In an alternative embodiment, multiple parameters are used in conjunction with the password to compute the value F. It is, for example, advantageous to combine a pseudo-random number with a time stamp. Such a combination provides a powerful tool against replay attacks and brute force attacks attempting to foil a password-based authentication mechanism.

P' is a concatenation of R and F(R, Password):

$$P'=R|F(R, \text{Password})$$

wherein the word concatenation is used broadly to mean any method of combining R and F(R,Password) such that R may be backed out of P'. That could be a concatenation in a traditional sense where R is of some certain length. However, it could be any other method of combining R and F in which R may be determined from the result.

Let's consider an example. If the password is "loesenord" and R is 333333, F(R,password)=F(333333, loesenord) which, for the purpose of the example, could be A4FE337D. P' would then be—using strict concatenation—333333A4FE337D. If it is known that R is always the first 6 digits of a request, the recipient may back out that R has the value 333333.

The security device 501 responds with the username and derived password P', step 909.

The client program 203 then formulates the request including the username and the derived password P', step 911.

The client computer 107 then transmits the request to the cloud service 105 executing on the cloud server 207, step 913.

The cloud service 105 determines R from the received request, step 915. As in the example above, if the received request contains the derivative password P' and by convention R is the first 6 digits of the derivative password P', the cloud service would determine that R equals 333333.

If multiple parameters are used to calculate the derivative password, the cloud service 105 determines each of the parameters by backing them out of the received request.

Having determined the value of the parameter(s) R, the cloud service 105 computes a derivative password (P") by applying the same parameter(s) R to the password for the user having the received username stored in a password database 919 that the cloud service maintains, step 917. The password database 919 may be stored in the cloud server 207 or as a separate network node.

If the password or password-equivalent used by the client program 203 to compute the derivative password is the same as the password or password-equivalent stored on the cloud server 207, the derivative password (P") computed by the cloud service 105 would be the same as the received derivative-password (P').

The cloud service 105 compares the received derivative-password (P') and the computed derivative-password (P"), step 921. If the two passwords do not match, access to the cloud resource is denied, step 923. Some form of recovery from having an incorrect password may be offered to the user, e.g., to try using a different security device or inviting the user to use a password recovery mechanism.

If the two passwords do match, the requested access is granted, step 925.

As noted above, in an alternative, the cloud service 105 may store the hash of the password in the password database 919. In that case, the security device 501 uses a one-way hash of the password instead of the actual password as the basis for the derivative password. To compute the derivative password, the client program would include the hash (H(P)) instead of P directly in the function F:

$$P'=R|F(R,H(\text{password}))$$

A corresponding formula is used by the cloud service 105.

In yet another alternative, the derivative password is computed using the public key of the cloud service 105:

$$P'=R|\text{Encr}(R,\text{password})_{pubKey(Cloud\ Service)}$$

A corresponding formula is used by the cloud service 105. The cloud service 105 is further modified to compute the server-side derivative password (P") by:

$$P''=\text{Decr}(P'-R)_{priKey(Cloud\ Service)}$$

In other regards, this alternative operates in the same manner as previously discussed alternatives.

Alternatively, the security device 501 computes the derivative password (P') by encrypting the password and the timestamp using a secret key shared with the server. In this embodiment, the security device 501 is operated to compute the derivative password (P') by:

$$P'=R|\text{Encr}(R,\text{password})_{sharedKey}$$

Conversely, the cloud service 105 computes the server-side derivative password (P") by:

$$P''=\text{Decr}(P'-R)_{sharedKey}$$

In yet another alternative, the security device 501 creates the derivative password (P') by encrypting the password using a secret key shared with the cloud service 105.

From the foregoing it will be apparent that a password-based authentication mechanism has been provided. The described mechanism enhances security to password-based authentication without adding a burden on cloud service providers to significantly redesign their authentication platforms.

Although specific embodiments of the invention have been described and illustrated, the invention is not to be limited to the specific forms or arrangements of parts so described and illustrated herein. The invention is limited only by the claims.

We claim:

1. A method for operating a computing system, the computer system including a client computer, a security device, and a server, wherein the client computer and the server engage in a communications session constituting a sequence of request-response communications between the client computer and the server, to authenticate a client program executing on the client computer to a server service executing on the server upon the client program making a service request of the server during said communications session, the method comprising:

operating the client computer to form the service request to the server in a request-response communications protocol using a process that includes transmitting a command to the security device to provide username and a derivative-password;

operating the security device:

in response to the command from the client computer to provide a username and derivative-password:

to generate a derivative-password using a first parameter and a password-equivalent value stored in the security device;

at least one time during the communications session, in conjunction with a user device operated by a user, to obtain authorization from the user granting permission to the security device to provide a derivative password to the client computer; and transmit an answer-message to the client computer, the answer-message including the first parameter, the derivative-password and the username;

operating the client computer to:

form the service request by including the answer-message received from the security device in the service request; and transmit the service request to the server; and operating the server to:

receive the service request from the client;

extract the first parameter, the derivative-password and the username from the service request;

compute a server-side-computed derivative of the password-equivalent value using the extracted first parameter and a server-side-stored password-equivalent value;

compare the received derivative-password to the server-side-computed derivative-password; and upon determining that the received derivative-password matches the server-side-computed derivative-password, fulfilling the service requested by the client computer.

2. The method for operating a computing system of claim 1 wherein the first parameter is a random number.

3. The method of claim 2 wherein the client computer is a computer server.

4. The method for operating a computing system of claim 1 further comprising operating the client computer to transmit a second parameter to the security device and wherein the derivative-password is generated by the security device using the first parameter and the second parameter, and wherein the answer-message from the security device includes the second parameter, and wherein the server extracts the second parameter and uses the second parameter to compute the server-side-computed derivative password.

5. The method for operating a computing system of claim 4 wherein the second parameter is a timestamp.

6. The method of claim 1 wherein the client computer is a user device.

7. The method for operating a computing system of claim 1 wherein the derivative-password is computed using a one-way cryptographic function F with a secret, the first parameter, and the stored password-equivalent value as arguments.

8. The method for operating a computing system of claim 1 wherein the derivative-password is computed using a one-way cryptographic keyed hash function, the first parameter and the stored password-equivalent value.

9. The method for operating a computing system of claim 1 wherein the server stores registered usernames and passwords, password-equivalent values, or one-way hashes of passwords in a database.

10. The method for operating a computing system of claim 1 wherein the password-equivalent value is the password.

11. The method for operating a computing system of claim 1 wherein the password-equivalent value is a one-way hash of the password.

12. The method for operating a computing system of claim 1 wherein the derivative-password is an encryption of the first parameter and the password-equivalent value using a public key of the server.

13. The method for operating a computing system of claim 1 wherein the derivative-password is an encryption of the first parameter and the password-equivalent value using a shared secret.

14. A cloud computing system comprising:

a client computer having a hardware processor and a storage device for storing programs executable by the processor of the client computer to cause the client computer to perform certain actions, the client computer storage device including instructions to cause the client computer to form a service request of a server in a request-response communications protocol the instructions directing the processor to:

issue a command to a security device to provide a username and password and receive an answer-message including username, a derivative-password generated by the security device using a first parameter and a password-equivalent value, and the first parameter;

form the service request to the server by including the answer-message from the security device in the service request;

the security device having a processor and a storage device for storing programs executable by the processor of the security device to cause the security device to perform certain actions, the security device storage device including instructions to cause the security device to:

at least one time during the communications session, in conjunction with a user device operated by a user, to obtain authorization from the user granting permission to the security device to provide a derivative password to the client computer;

generate a derivative-password using a first parameter and a password equivalent value stored on the security device in response the command to provide a username and derivative password; and transmit an answer-message including the user name, the derivative-password and the first parameter used to compute the derivative-password to the client computer; and a server having a processor and a storage device for storing programs executable by the processor of the server to cause the server to perform certain actions, the server storage device including instructions to cause the server to:

receive the service request from the client;

extract the first parameter, the derivative-password and the username from the service request;

compute a server-side-computed derivative of the password using the extracted first parameter and a server-side-stored password-equivalent value;

compare the received derivative-password to the server-side-computed derivative-password; and upon determining that the received derivative-password matches the server-side-computed derivative-password, fulfilling the service requested by the client computer.

15. The cloud computing system of claim 14 wherein the first parameter is a random number.

16. The cloud computing system of claim 15 wherein the client computer is a computer server.

17. The cloud computing system of claim 14 wherein the instructions to cause the client computer to form a service request further comprises transmitting a second parameter to the security device wherein the security device further includes instructions to generate the derivative-password using the first parameter and the second parameter, and wherein the answer-message from the security device includes the second parameter, and wherein the server includes instructions to extract the second parameter and to use the second parameter to compute the server-side-computed derivative password.

18. The cloud computing system of claim 17 wherein the second parameter is a timestamp.

19. The cloud computing system of claim 14 wherein the client computer is a user device.

20. The cloud computing system of claim 14 wherein the derivative-password is computed using a one-way cryptographic function F with a secret, the first parameter, and the stored password-equivalent value as arguments.

21. The cloud computing system of claim 14 wherein the derivative-password is computed using a one-way cryptographic keyed hash function, the first parameter and the stored password-equivalent value.

22. The cloud computing system of claim 14 wherein the server stores registered usernames and passwords or one-way hashes of passwords in a database.

23. The cloud computing system of claim 14 wherein the password-equivalent is the password.

24. The cloud computing system of claim 14 wherein the password-equivalent is a one-way hash of the password.

25. The cloud computing system of claim 14 wherein the derivative-password is an encryption of the first parameter and the password-equivalent using a public key of the server.

26. The cloud computing system of claim 14 wherein the derivative-password is an encryption of the first parameter and the password-equivalent using a shared secret.

27. A security device with a processor programmed to perform the security device steps of a method comprising:
   operating a client computer to form a service request to a server using a process that includes transmitting an answer-message to the security device to provide username and a derivative-password;
   operating the security device to:
   generate a derivative-password using a parameter and a password-equivalent value stored in the security device;
   at least one time during the communications session, in conjunction with a user device operated by a user, to obtain authorization from the user granting permission to the security device to provide a derivative password to the client computer; and
   transmit an answer-message to the client computer, the answer-message including the parameter, the derivative-password and the username;
   operating the client computer to:
   form the service request by including the answer-message received from the security device in the service request; and
   transmit the service request to the server; and
   operating the server to:
   receive the service request from the client;
   extract the parameter, the derivative-password and the username from the service request;
   compute a server-side-computed derivative of the password-equivalent value using the extracted parameter and a server-side-stored password-equivalent value;
   compare the received derivative-password to the server-side-computed derivative-password; and
   upon determining that the received derivative-password matches the server-side-computed derivative-password, fulfilling the service requested by the client computer.

* * * * *